United States Patent
Beda, III et al.

(10) Patent No.: US 8,909,939 B1
(45) Date of Patent: Dec. 9, 2014

(54) DISTRIBUTION OF CRYPTOGRAPHIC HOST KEYS IN A CLOUD COMPUTING ENVIRONMENT

(75) Inventors: Joseph S. Beda, III, Seattle, WA (US); Brandon S. Baker, Redmond, WA (US)

(73) Assignee: Google Inc., Mountain View, CA (US)

( * ) Notice: Subject to any disclaimer, the term of this patent is extended or adjusted under 35 U.S.C. 154(b) by 132 days.

(21) Appl. No.: 13/439,256

(22) Filed: Apr. 4, 2012

(51) Int. Cl.
*G06F 11/30* (2006.01)

(52) U.S. Cl.
USPC .......................................................... 713/189

(58) Field of Classification Search
USPC .......................................................... 713/189
See application file for complete search history.

(56) References Cited

U.S. PATENT DOCUMENTS

| | | | |
|---|---|---|---|
| 5,463,768 A | 10/1995 | Cudihy et al. | |
| 6,598,179 B1 | 7/2003 | Chirashnya et al. | |
| 7,062,718 B2 | 6/2006 | Kodosky et al. | |
| 7,117,243 B2 | 10/2006 | Peart | |
| 7,650,331 B1 | 1/2010 | Dean et al. | |
| 7,653,833 B1 | 1/2010 | Miller et al. | |
| 7,761,573 B2 | 7/2010 | Travostino et al. | |
| 7,804,862 B1 | 9/2010 | Olson et al. | |
| 8,146,147 B2 | 3/2012 | Litvin et al. | |
| 2004/0139368 A1 | 7/2004 | Austen et al. | |
| 2005/0166011 A1 | 7/2005 | Burnett et al. | |
| 2006/0161753 A1 | 7/2006 | Aschoff et al. | |
| 2007/0199058 A1 | 8/2007 | Baumgart et al. | |
| 2007/0271604 A1 | 11/2007 | Webster et al. | |
| 2007/0280243 A1 | 12/2007 | Wray et al. | |
| 2008/0086515 A1 | 4/2008 | Bai et al. | |
| 2008/0205415 A1 | 8/2008 | Morales | |
| 2008/0215796 A1 | 9/2008 | Lam et al. | |
| 2009/0097657 A1 | 4/2009 | Scheidt et al. | |
| 2009/0199177 A1 | 8/2009 | Edwards et al. | |
| 2009/0222815 A1 | 9/2009 | Dake | |
| 2009/0241108 A1 | 9/2009 | Edwards et al. | |
| 2009/0249440 A1 | 10/2009 | Platt et al. | |
| 2009/0300605 A1 | 12/2009 | Edwards et al. | |
| 2010/0057913 A1 | 3/2010 | DeHaan | |
| 2010/0071035 A1 | 3/2010 | Budko et al. | |
| 2010/0199089 A1 | 8/2010 | Vysogorets et al. | |
| 2010/0287548 A1 | 11/2010 | Zhou et al. | |
| 2011/0022812 A1 | 1/2011 | van der Linden et al. | |
| 2011/0153838 A1 | 6/2011 | Belkine et al. | |

(Continued)

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.

(Continued)

*Primary Examiner* — Tu Nguyen
(74) *Attorney, Agent, or Firm* — Fish & Richardson P.C.

(57) ABSTRACT

Methods, systems, and apparatuses, including computer programs encoded on a computer storage medium, for distribution of cryptographic keys. In one aspect, a method includes receiving a plurality of requests, each request being received by a different respective virtual machine of a plurality of virtual machines; generating, by each of the virtual machines, a different host key pair, wherein each of the host key pairs comprises an encryption key and a decryption key that are associated with the virtual machine that generated it; providing, by each of the virtual machines, the encryption key generated by the virtual machine to a distinct metadata server that stores parameters of the virtual machine; and sending, from each of the metadata servers, the encryption key generated by the virtual machine that the metadata server is configured to communicate with to an application programming interface system.

30 Claims, 4 Drawing Sheets

(56) References Cited

U.S. PATENT DOCUMENTS

| | | | |
|---|---|---|---|
| 2011/0179412 A1* | 7/2011 | Nakae et al. ............. | 718/1 |
| 2011/0231280 A1 | 9/2011 | Farah | |
| 2011/0258441 A1 | 10/2011 | Ashok et al. | |
| 2012/0084570 A1* | 4/2012 | Kuzin et al. ............. | 713/182 |

OTHER PUBLICATIONS

Primet, Pascale, et al.., "HIPCAL: State of the Art of OS and Network virtualization solutions for Grids", Sep. 14, 2007, 38 pages.
Abdull, AlastairIrvine, et al. "Generic Routing Encapsulation", [online] [retrieved on Jan. 4, 2011]. Retrieved from the Internet: <URL: http://creativecommons.org/licenses/by-sa/3.0/>, 5 pages.
Farinacci et al., "RFC 2784: Generic Routing Encapsulation (GRE)", Mar. 2000, The Internet Society, 10 pages.
Kent et al., "RFC 4301: Security Architecture for the Internet Protocol", Dec. 2005, The Internet Society, 102 pages.
Wikipedia, "Domain Name System" [online]; Feb. 4, 2012; [Retrieved on Feb. 4, 2012]. Retrieved from the Internet: <URL: http://en.wikipedia.org/wiki/Domain_Name_System>, 16 pages..
Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.
Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.
Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.
Wikipedia. "OAuth." [online], Dec. 12, 2010; [Retrieved on Jan. 20, 2011] Retrieved from the Internet <URL: http://en.wikipedia.org/wiki/OAuth>; 3 pages.
Gowalla. "API Documentation—Oauth." [Retrieved on Apr. 26, 2011]. Retrieved from the Internet <URL: http://gowalla.com/api/docs/oauth>, 4 pages.
Apache HTTP Server Version 2.0. "Log Files." [Retrieved on Feb. 15, 2011]. Retrieved from the Internet <URL: http://httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
Travostino, Franco, et al., Seamless Live Migration of Virtual Machines over the MAN/WAN, 2006, Elsevier Future Generation Computer Systems 2006, 10 pages.
VMCI Datagram API [Retrieved on Jun. 8, 2011], Retrieved from the Internet: <URL: http://pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling—Getting Started Guide—API Version Jan. 8, 2012. Amazon Web Services LLC, 2010, 20 pages.
Amazon Auto Scaling—Developer Guide—API Version Aug. 1, 2010. Amazon Web Services LLC, 2011, 62 pages.
Amazon CloudWatch—Developer Guide—API Version Aug. 1, 2010. Amazon Web Services LLC, 2010, 75 pages.
Benincosa. "Ganglia and Nagios, Part 2: Monitor enterprise clusters with Nagios-Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
'Zabbix' [online]. "Zabbix 1.8: The Ultimate Open Source Monitoring Solution," 2001-2012, [retrieved on Feb. 3, 2011]. Retrieved from the Internet: URL: <http://www.zabbix.com/features.php.> 1 page.
Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.
Paravirtualization, Wikipedia Article, downloaded from http://en.wikipedia.org/wiki/Paravirtualization on Mar. 18, 2012.
Paravirtualized File Systems, Eric Van Hensbergen, downloaded from http://www.slideshare.net/ericvh/9p-on-kvm on Mar. 18, 2012.
"IPsec". Creativecommons.org [online]. Creative Commons Attribution-Share Alike 3.0 Unported, Nov. 11, 2010; [Retrieved on Jan. 14, 2011] Retrieved from the Internet: <URL: http://en.wikipedia.org/w/index.php?oldid=396193389>; pp. 1-8.
"Generic Routing Encapsulation". Creativecommons.org [online]. Creative Commons Attribution-Share Alike 3.0 Unported, Nov. 12, 2010; [Retrieved on Jan. 14, 2011]; Retrieved from the Internet: <URL: http://en.wikipedia.org/w/index.php?oldid=396280384>; pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.
Managing Amazon EC2—SSH Login and Protecting Your Instances, Everyday's Findings, Monday, May 18, 2009, Retrieved from the (56) References Cited

OTHER PUBLICATIONS

Internet on Nov. 18, 2011; Retrieved from: <URL: http://blog.tag-gesell.de/index.php?/aarchives/73-Managing-Amazon-EC2., 6 pages.

Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.

Live Migration of Virtual Machines, Clark et al., University of Cambridge Laboratory, Department of Computer Science; University of Copenhagen, Denmark, 2005; 14 pages.

Making Services Easy to Migrate, Debian Administration, System Administration Tips and Resources, Jan. 1, 2005, 5 pages.

L. Gommans, et al., Token-Based Authorization of Connection Oriented Network Resources, 1st International Workshop on Networks for Grid Applications (GridNets 2004), Oct. 29, 2004; 8 pages.

* cited by examiner

DISTRIBUTION OF CRYPTOGRAPHIC HOST KEYS IN A CLOUD COMPUTING ENVIRONMENT

BACKGROUND

This specification relates to distribution of cryptographic keys and, in particular, distribution of cryptographic keys for use in communication with virtual machines in a cloud computing environment.

A cryptographic key (or "key") is a piece of information that determines the functional output of a cryptographic algorithm or cipher. In encryption, a key specifies the particular transformation of plaintext into ciphertext, or vice versa during decryption. Keys can also be used in a network protocol for secure data communication, remote shell services, or command execution between two networked computers via a secure channel over an insecure network such as the Internet.

Cloud computing is network-based computing in which typically large collections of servers housed in data centers or "server farms" provides computational resources and data storage as needed to remote end users. Some cloud computing services allow end users to run user-provided server software applications (e.g., e-commerce server application, web server, or file server) in the cloud. Some other cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on the server farm may simplify management of end user computing devices. Some cloud computing services allow end users to execute software applications in virtual machines.

SUMMARY

This specification describes technologies relating to distribution of cryptographic host keys.

The system described can provide a unique cryptographic host key pair to a new virtual machine. The system can either generate the unique cryptographic host key pair at an Application Program Interface (API) system or the new virtual machine. If the system generates the host key pair at the API system, the API system will send the host key pair to the new virtual machine through a metadata server. If the system generates the host key pair at the new virtual machine, the new virtual machine will send the public key from the host key pair to an API system through a metadata server. In either case, a client device can receive the public key from the API system.

In general, one innovative aspect of the subject matter described in this specification can be embodied in methods that include the actions of receiving a plurality of different requests from a plurality of different virtual machines, wherein each virtual machine is a hardware virtualization; based on the requests, generating a plurality of different host key pairs, each host key pair comprising an encryption key and a decryption key and being associated with a respective virtual machine of the plurality of virtual machines; sending each host key pair to the associated virtual machine using a different metadata server for each host key pair, wherein the metadata server is configured to exchange metadata with the associated virtual machine; and providing the encryption key of each host key pair to a respective client.

These and other embodiments can each optionally include one or more of the following features. A particular request of the plurality of requests is generated by a virtual machine of the plurality of virtual machines or by the client. The data processing apparatus is one or more servers that provides an application programming interface and is configured to communicate with the client using a secure protocol. The secure protocol is Hypertext Transfer Protocol Secure. Each host key pair is generated during bootup of the respective virtual machine.

In general, one innovative aspect of the subject matter described in this specification can be embodied in methods that include the actions of receiving a plurality of requests, each request being received by a different respective virtual machine of a plurality of virtual machines wherein the virtual machines are hardware virtualizations; generating, by each of the virtual machines, a different host key pair wherein the host key pair comprises an encryption key and a decryption key that are associated with the virtual machine; providing, by each of the virtual machines, the encryption key generated by the virtual machine to a distinct metadata server that stores parameters of the virtual machine and that is configured to communicate with the virtual machine but not with other virtual machines of the plurality of virtual machines; and sending, from each of the metadata servers, the encryption key generated by the virtual machine that the metadata server is configured to communicate with to an application programming interface system.

These and other embodiments can each optionally include one or more of the following features. The request is generated by a virtual machine or by a client device. The metadata server is configured to communicate with the virtual machine using a secure protocol. The secure protocol is Hypertext Transfer Protocol Secure. The host key pair is generated during bootup of the virtual machine. The application programming interface system includes data processing apparatuses that are configured to process client requests. The client requests include requests for the encryption key associated with the virtual machine, status of the virtual machine, or load of the virtual machine.

Particular embodiments of the subject matter described in this specification can be implemented so as to realize one or more of the following advantages. The system can securely distribute cryptographic host keys to a newly created virtual machine. This allows client devices (or "clients") to verify a destination virtual machine and securely communicate with the virtual machine created by the system. In a dynamic cloud environment where virtual machines are created and destroyed frequently from the same Internet Protocol addresses, the system can verify a host identity. A client can connect to an API system over a protocol to retrieve an encryption key. The API system can manage encryption keys of many virtual machines at once. The virtual machine can receive a cryptographic host key during bootup through a metadata server. The virtual machine can also communicate an encryption key to an API system during bootup through a metadata server.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
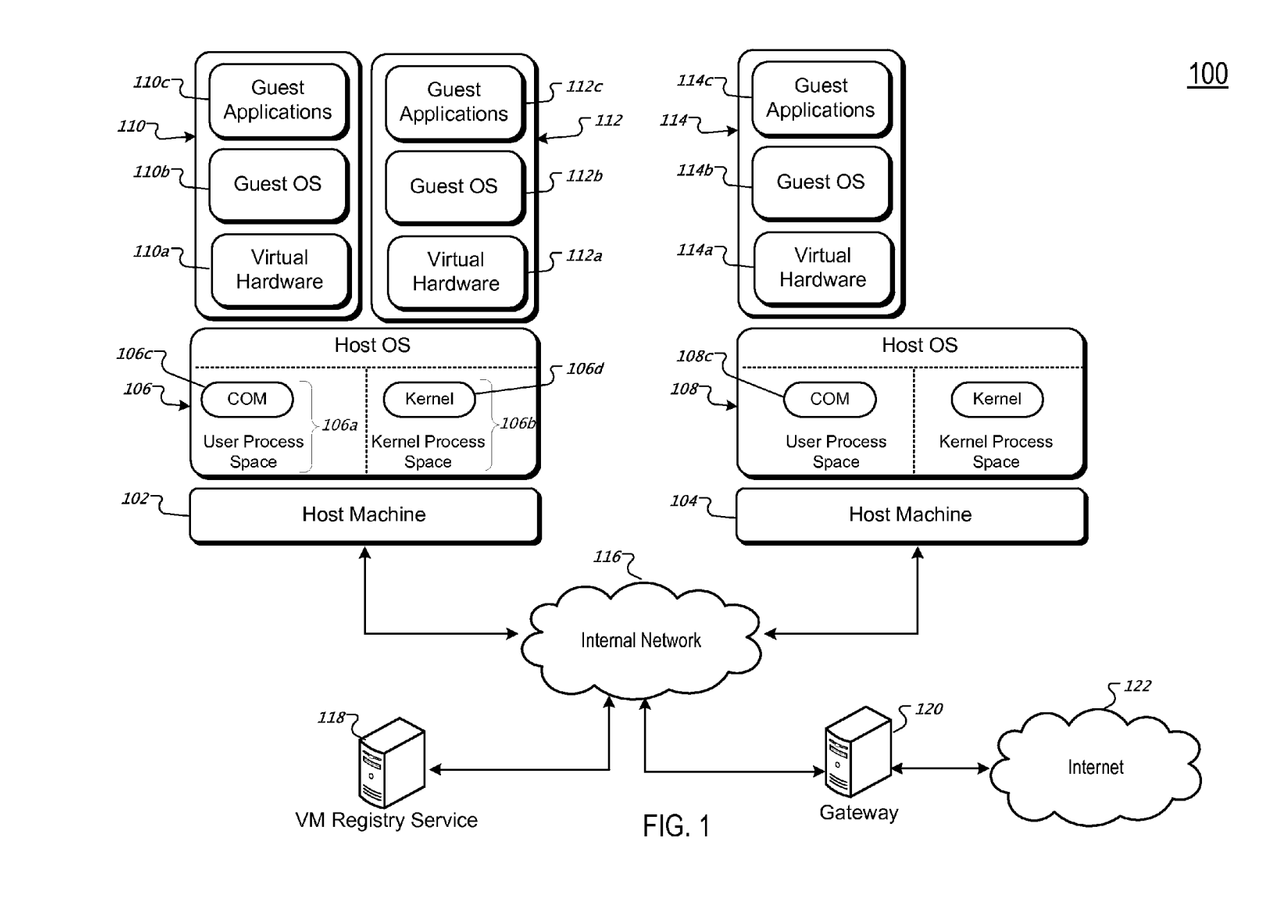
FIG. 1 is a schematic illustration of an example virtual machine system.

FIG. 1 is a schematic illustration of an example virtual machine system 100. The system 100 includes one or more host machines such as, for example, host machine 102 and host machine 104. Generally speaking, a host machine includes one or more data processing apparatuses such as rack mounted servers or other computing devices. The data processing apparatuses can be in different physical locations and can have different capabilities and computer architectures. Host machines can communicate with each other through an internal data communications network 116. The internal network can include one or more wired (e.g., Ethernet) or wireless (e.g., WI-FI) networks, for example. In some implementations, the internal network 116 is an intranet. Host machines can also communicate with devices on external networks, such as the Internet 122, through one or more gateways 120 which are data processing apparatuses responsible for routing data communication traffic between the internal network 116 and the external network 122. Other types of external networks are possible.

Each host machine executes a host operating system or other software that virtualizes the underlying host machine hardware and manages concurrent execution of one or more virtual machines (e.g., a virtual machine monitor or hypervisor). For example, the host operating system 106 is managing virtual machine (VM) 110 and VM 112, while host OS 108 is managing a single VM 114. Each VM includes a simulated version of the underlying host machine hardware, or a different computer architecture. The simulated version of the hardware is referred to as virtual hardware (e.g., virtual hardware 110a, 112a and 114a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can persist across VM restarts. Virtual disk blocks are allocated on physical disk drives coupled to host machines or available over the internal network 116, for example. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses and one or more User Datagram Protocol (UDP) port numbers. Other address schemes are possible.

A VM's guest software can include a guest operating system (e.g., guest operating systems 110b, 112b and 114b), which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c). In some implementations, the communication process executes in the user process space (e.g., user process space 106a) of a host operating system (e.g., host operating system 106). In other implementations, the communication process can execute in the kernel process space (e.g., kernel process space 106d) of the host operating system. There can be a single communication process for all VMs executing on a host machine or multiple communication processes, one for each VM executing on a host machine. In yet further implementations, some portion of the communication process executes in the user process space and another portion executes in the kernel process space. The communication process communicates with a directory service (e.g., VM registry service 118) in order to establish a virtual network pair (VNP) between two VMs. A virtual network pair (VNP) is a logical computer network that is implemented on top of one or more physical (wired or wireless) computer networks. A VNP can be implemented with a tunneling protocol, for example. A VNP routes traffic between two endpoints using one or more virtual connections or links. By way of illustration, a VNP between virtual machine 110 and virtual machine 114 would route packets sent between VNP endpoints managed respectively by communication processes 106c and 108c over internal network 116. The VM registry service 118 is one or more data processing apparatuses that execute software for keeping track of assignments of network addresses (e.g., IP addresses) to VMs, and for keeping track of network addresses (e.g., IP addresses) of host machines that the VMs are executing on. The data processing apparatuses can be in different locations and can have different capabilities and computer architectures.

Figure 2:
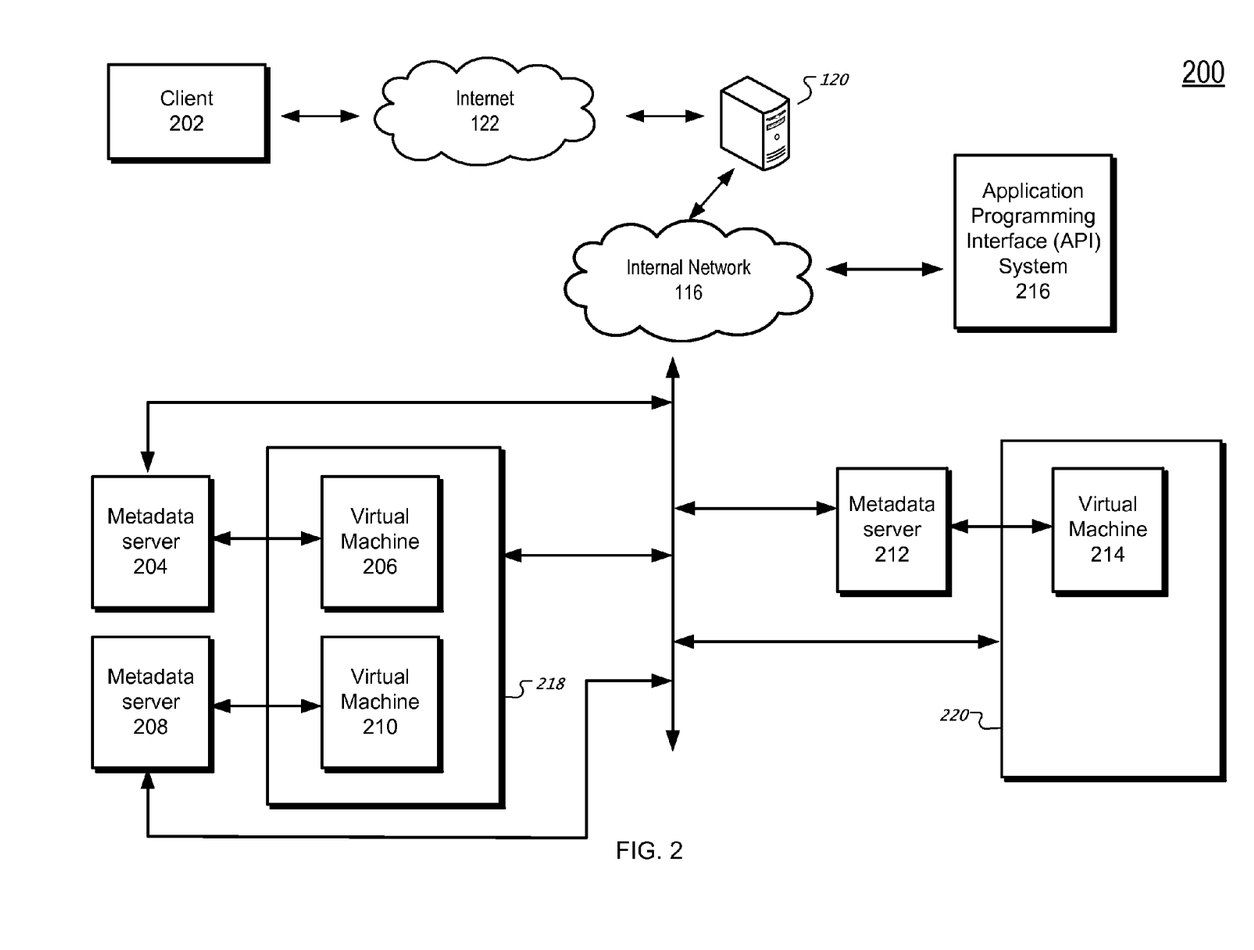
FIG. 2 is a schematic illustration of an example system that distributes cryptographic host keys.

FIG. 2 is a schematic illustration of an example system 200 that distributes cryptographic host keys. The system 200 can include an Application Programming Interface (API) system 216, host machines 218, 220, VMs 206, 210 on the host machines, and metadata servers 204, 208, and 212. In some implementations, the metadata servers 204, 208, and 212 run on the same hardware as the host machines 218, 220. In some implementations, VMs communicate with a shared metadata server. The API system 216 can communicate with the host machines 218, 220, VMs 206, 210, 214, and metadata servers 204, 208, 212 through the internal network 116. The API system 216 can include one or more data processing apparatuses to process client requests as described below. The data processing apparatuses within the API system 216 can be in the same physical location (e.g., data center) or can be in different physical locations. The data processing apparatuses can have different capabilities and computer architectures. In some implementations, the API system 216 receives a request from a client 202 (e.g., through a secure communication protocol), processes the request (e.g., by performing operations on VMs associated with a client), and sends a response to the client. For example, the client can request the API system to check on the status of a VM (e.g., whether the VM is operational). The API system receives the request, processes the request by communicating with the VM and determining its status (e.g., by retrieving a most recently cached status), and then sends the status of the VM to the client. The client can request the API system to create a new VM instance and the IP location of the VM.

A client 202 can connect to the system 200 through the Internet 122. In some implementations, the client 202 connects to the internal network 116 through a gateway 120. In some implementations, the internal network 116 includes an encapsulated virtual network built on top of an internal network. In some implementations, the client 202 communicates with the API system 216 (e.g., when requesting a VM's public encryption key). In some implementations, the client 202 communicates directly with a VM (e.g., to perform an operation on the VM).

The system can include host machines 218, 220. Each host machine can run one or more VMs. For example, the host machine 218 can host multiple VMs 206, 210. The host machine 220 can host a VM 214. Each VM can be associated with a corresponding metadata server. For example, metadata server 204 is associated with VM 206, metadata server 208 is associated with VM 210, and metadata server 212 is associated with VM 214. A metadata server can be data processing apparatuses or a VM hosted on a host machine.

Each metadata server can store metadata associated with a corresponding virtual machine. Each metadata server can obtain metadata associated with the corresponding VM from the API system 216, virtual machine monitor, hypervisor, or other data processing apparatuses connected to the internal network 116. Metadata can include cryptographic host keys, load statistics, parameters that establish operations to be performed by a VM (e.g., a specific bootup sequence or a specific response to be sent to a client), or other data related to the VM. A metadata server can communicate with its corresponding VM, and vice-versa, at any point during or after the VM's creation. For example, while a VM is being created, the VM can retrieve metadata from the metadata server that includes parameters of the VM's bootup sequence (e.g., parameters that instruct the VM to generate cryptographic host key pairs during bootup). For example, if the VM 206 is associated with a project ("Project 1"), the corresponding metadata server 204 can store metadata related to Project 1 and/or metadata specifically related to the VM 206. In some implementations, instead of each VM being associated with a corresponding metadata server, two or more VMs can share a metadata server.

In some implementations, each metadata server is configured to receive and respond to requests for metadata from its corresponding VM but cannot receive or respond to requests for metadata from a VM other than the corresponding VM. For example, the metadata server 204 can receive and respond to requests for metadata from its corresponding VM 206 but cannot receive or respond to requests for metadata from the VM 210 or the VM 214. In some implementations, the metadata includes cryptographic host keys.

Cryptographic host keys can be used to authenticate a device to a user connecting to a device. For example, host keys can be used by the VM to authenticate itself to a client device that connects to the VM. Host key pairs include two different types of host keys. For example, a host key pair can include both a public key and a private key. The public key can be a public encryption key while the private key can be a private decryption key. Conversely, the public key can be the decryption key while the private key can be the encryption key. In various implementations, the system 200 will use the public key as an encryption key and the private key as a decryption key. Generally, the public key is widely distributed while the private key is known only to a recipient (e.g., the VM). Messages can be encrypted using the public key and can only be decrypted using the private key. The keys are related mathematically, but determining the private key from the public key is prohibitively expensive.

The system 200 can distribute cryptographic host keys in two implementations: 1) generation of a host key pair and distribution of the host key pair through an API system or 2) generation of a host key pair at a VM with distribution of the public key of the host key pair through an API system. This is described further below in regards to FIGS. 3 and 4. In some implementations, distribution of cryptographic host keys using the second implementation is more secure. In the first implementation, an API system generates the host key pair and sends the host key pair to a VM. Therefore, the host key pair is temporarily separated from the VM and potentially vulnerable to attacks (e.g., an attacker listening on an internal network). However, in the second implementation, the VM generates the host key pair and the host key pair is never separated from the VM. Therefore, this implementation does not expose the host key pair to a potential attacker through an internal network.

Figure 3:
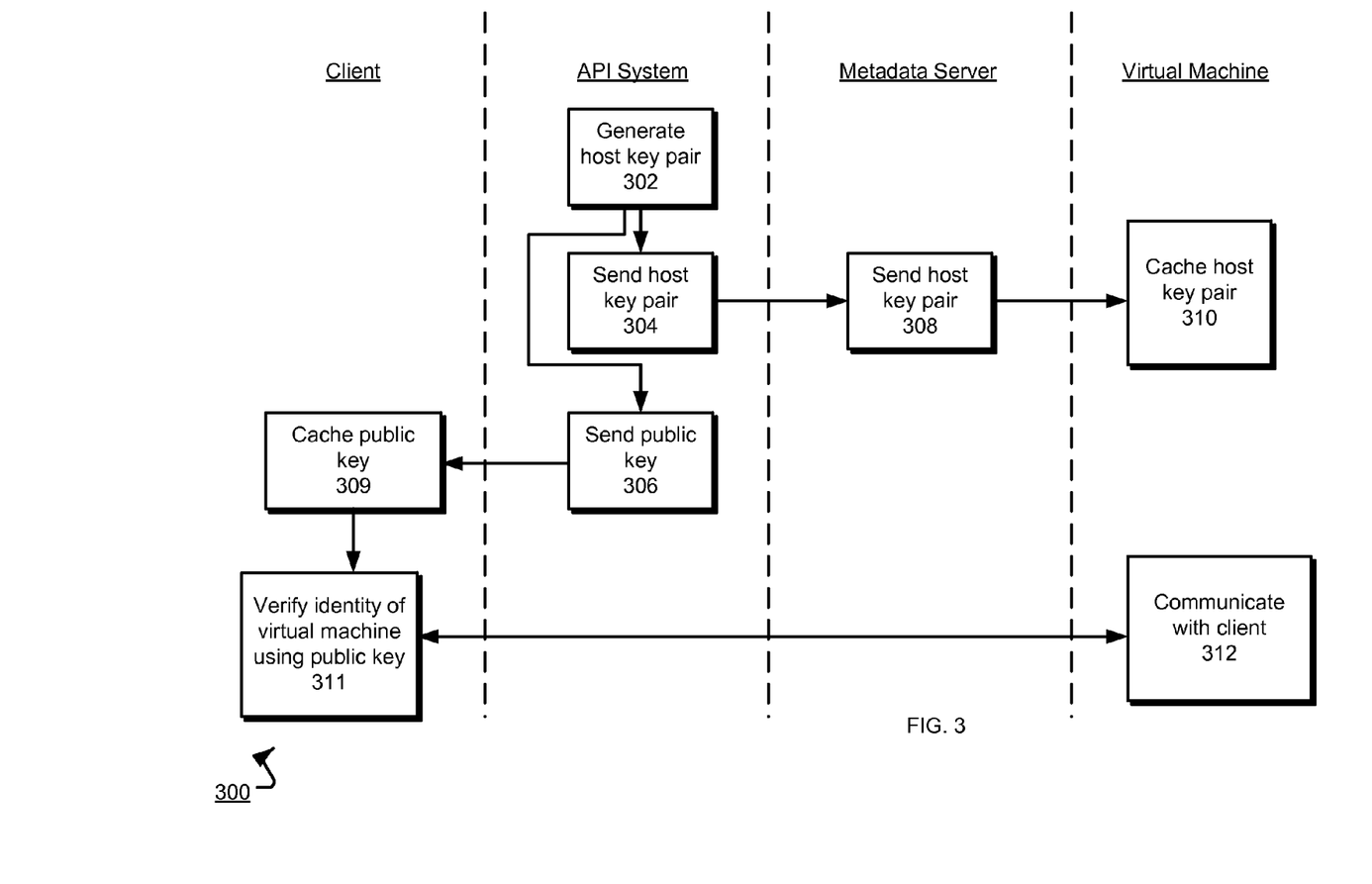
FIG. 3 is a flow chart of an example method of generating a cryptographic host key pair at an API system.

FIG. 3 is a flow chart of an example method 300 of generating a cryptographic host key pair at an API system. First, the API system generates a host key pair (block 302). In some implementations, the API system uses the Rivest, Shamir, Adleman (RSA) algorithm to generate the host key pair. Other host key generation algorithms are possible. In some implementations, the API system associates the public key of the host key pair with a VM. The API system can send the host key pair to a metadata server associated with the VM (block 304). The metadata server receives the host key pair and sends it to the VM when the VM requests it (block 308). In some implementations, the VM will not request the host key pair while the VM is still being created. Therefore, the metadata server can act as a proxy that holds the host key pair until the VM can receive and process (e.g., cache) the host key pair. Once the VM receives the host key pair, the VM can cache it and securely conduct future communications using the host key pair (block 310).

The API system also can send only the public key, and not the private key, to a client (block 306). In some implementations, the API system sends the public key when the client requests it. Once the client receives the public key, the client can cache it (block 309). In some implementations, the client can determine an address of the VM by requesting the address from the API system. Because the API system can associate a public key with a VM, the API system can send the associated VM's location to a client having the public key. In some implementations, the API system sends the address of the VM along with the public key associated with the VM to the client. The client can then verify the identity of the VM using the public key associated with the VM (block 311).

The client can communicate with the VM by encrypting messages using the public key. When the VM receives the encrypted message, the VM can use its cached private key to decrypt the message. In some implementations, the client generates its own public/private key pair and sends the VM the client's public key. When the VM caches the client's public key, the VM can also communicate with the client by encrypting messages using the client's public key (block 312). Likewise, when the client receives the encrypted message, the client can use its private key to decrypt the message. In some implementations, the secure communication protocol used is different than the host key pairs used for verifying the VM's identity. For example, the secure communication protocol can use a symmetric cypher with a shared secret established via the Diffie Hellman algorithm.

Figure 4:
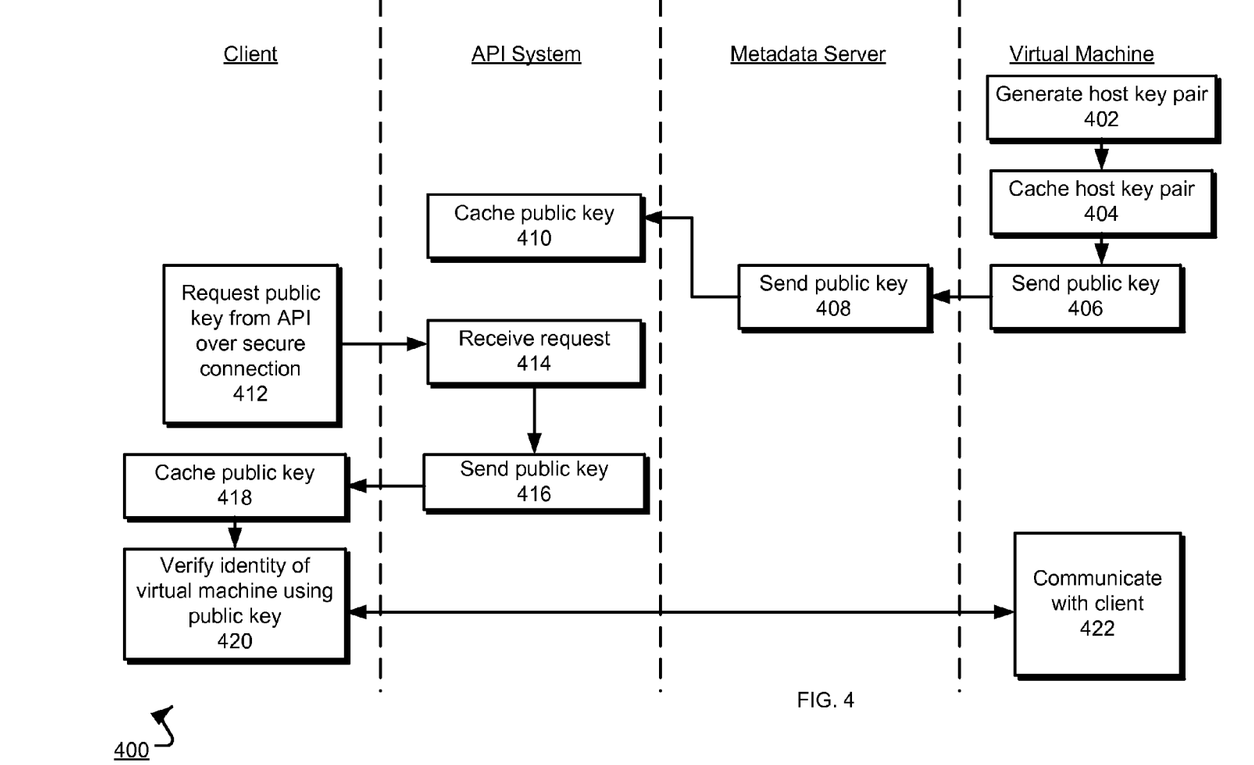
FIG. 4 is a flow chart of an example method of generating a cryptographic host key pair at a virtual machine.

FIG. 4 is a flow chart of an example method 400 of generating a cryptographic host key pair at a VM. In contrast to the method described in FIG. 3, the VM (not the API system) generates a host key pair containing a public key and a private key (block 402). In some implementations, the VM uses the RSA algorithm to generate the host key pair. Other host key generation algorithms are possible. After generating the host key pair, the VM can cache the host key pair (block 404). The VM can then send the public key of the host key pair to a metadata server (block 406). In some implementations, the VM generates and sends the public key to the metadata server during bootup, during which time the VM can communicate with the metadata server. Upon receiving the public key, the metadata server can send the public key to an API system (block 408). In some implementations, the VM sends the public key after the VM is capable of communicating with others on the network (e.g., the VM can communicate with the API system after booting up). For example, the VM can send the public key directly to the API system and bypass the metadata server. Once the API system receives the VM's public key, the API system can cache the public key (block 410) and wait for a client to request an action from the API system. In some implementations, the API system associates the public key with the VM that sent the public key.

A client can send a request to obtain a public key from the API system through a secure connection (block 412). In some implementations, the secure connection implements Hypertext Transfer Protocol Secure (HTTPS). In some implementations, the request includes a specific VM that the client wishes to communicate with. Once the API system receives the request (block 414), the API system can retrieve the public key associated with the VM in the request and can send the public key to the client over the secure connection (block 416). In some implementations, the client can request a new VM, and the API system will assign a VM to the client while sending a response to the client including a public key associated with the VM. In some implementations, the request can include specific parameters of the new VM (e.g., VM location, memory, storage size, or computing power). In some implementations, the API system also sends the VM's address to the client. Upon receiving the public key, the client can cache the public key (block 418). Then, the client can connect directly to the VM using the VM's address from the API system and verify the identity of the VM using the VM's public key (blocks 420).

Similar to the method described above in FIG. 3, the client and VM can securely communicate with each other using the VM's public key or another secure communication protocol (block 422).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatuses. Alternatively or in addition, the program instructions can be encoded on an artificially-generated propagated signal, e.g., a machine-generated electrical, optical, or electromagnetic signal, that is generated to encode information for transmission to suitable receiver apparatuses for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatuses, devices, and machines for processing data, including by way of example a programmable processor, a computer, a system on a chip, or multiple ones, or combinations, of the foregoing The apparatuses can include special purpose logic circuitry, e.g., an FPGA (field programmable gate array) or an ASIC (application-specific integrated circuit). The apparatuses can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatuses and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatuses, cause the apparatuses to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving, using one or more data processing apparatuses, a plurality of different requests for an encryption key pair from a plurality of different virtual machines, wherein each virtual machine is a hardware virtualization;
    for each request, generating, using the one or more data processing apparatuses, a host key pair, the host key pair comprising an encryption key and a decryption key for encrypting and decrypting communications between a respective virtual machine that sent the request and a client device that is separate from the respective virtual machine;
    for each request, sending, using the one or more data processing apparatuses, the host key pair to a metadata server for the respective virtual machine that sent the request, wherein the metadata server is configured to exchange metadata with the respective virtual machine, and wherein each host key pair is sent to the respective virtual machine using a different metadata server for each host key pair; and
    providing, using the one or more data processing apparatuses, the encryption key of the host key pair to the client device upon a client request from the client device.

2. The method of claim 1 wherein a particular request of the plurality of requests is generated by a virtual machine of the plurality of virtual machines or by the client device.

3. The method of claim 1 wherein the one or more data processing apparatuses are one or more servers that provides an application programming interface and is configured to communicate with the client device using a secure protocol.

4. The method of claim 1 wherein the host key pair is generated during bootup of the respective virtual machine.

5. A method performed by one or more data processing apparatuses, the method comprising:
    receiving a plurality of requests for an encryption key pair, each request being received by a different respective virtual machine of a plurality of virtual machines, wherein the virtual machines are hardware virtualizations, and wherein the virtual machines execute on the one or more data processing apparatuses;
    generating, by each of the virtual machines, a host key pair for the virtual machine, wherein each of the host key pairs comprises an encryption key and a decryption key for encrypting and decrypting communications between the virtual machine that generated the host key pair and a client device that is separate from the each of the virtual machines;
    providing, by each of the virtual machines, the encryption key generated by the virtual machine to a distinct metadata server that stores parameters of the virtual machine and that is configured to communicate with the virtual machine but not with other virtual machines of the plurality of virtual machines; and
    sending, from each of the metadata servers, the encryption key generated by the virtual machine that the metadata server is configured to communicate with to an application programming interface system.

6. The method of claim 5 wherein the request is generated by a virtual machine or by a client device.

7. The method of claim 5 wherein the metadata server is configured to communicate with the virtual machine using a secure protocol.

8. The method of claim 5 wherein the host key pair is generated during bootup of the virtual machine.

9. The method of claim 5 wherein the application programming interface system includes data processing apparatuses that are configured to process client requests.

10. The method of claim 9 wherein the client requests include requests for the encryption key associated with the virtual machine, status of the virtual machine, or load of the virtual machine.

11. A system comprising:
    one or more data processing apparatus; and
    computer-readable medium coupled to the one or more data processing apparatus and having instructions stored thereon, which, when executed by the one or more data processing apparatus, cause the one or more data processing apparatus to perform operations comprising:
        receiving, using one or more data processing apparatuses, a plurality of different requests for an encryption key pair from a plurality of different virtual machines, wherein each virtual machine is a hardware virtualization;
        for each request, generating, using the one or more data processing apparatuses, a host key pair, the host key pair comprising an encryption key and a decryption key for encrypting and decrypting communications between a respective virtual machine that sent the request and a client device that is separate from the respective virtual machine;
        for each request, sending, using the one or more data processing apparatuses, the host key pair to a metadata server for the respective virtual machine that sent the request, wherein the metadata server is configured to exchange metadata with the respective virtual machine, and wherein each host key pair is sent to the respective virtual machine using a different metadata server for each host key pair; and
        providing, using the one or more data processing apparatuses, the encryption key of the host key pair to the client device upon a client request from the client device.

12. The system of claim 11 wherein a particular request of the plurality of requests is generated by a virtual machine of the plurality of virtual machines or by the client device.

13. The system of claim 11 wherein the one or more data processing apparatuses are one or more servers that provides an application programming interface and is configured to communicate with the client device using a secure protocol.

14. The system of claim 11 wherein the host key pair is generated during bootup of the respective virtual machine.

15. A system comprising:
    one or more data processing apparatus; and
    computer-readable medium coupled to the one or more data processing apparatus and having instructions stored thereon, which, when executed by the one or more data processing apparatus, cause the one or more data processing apparatus to perform operations comprising:
        receiving a plurality of requests for an encryption key pair, each request being received by a different respective virtual machine of a plurality of virtual machines, wherein the virtual machines are hardware virtualizations, and wherein the virtual machines execute on the one or more data processing apparatuses;

generating, by each of the virtual machines, a host key pair for the virtual machine, wherein each of the host key pairs comprises an encryption key and a decryption key for encrypting and decrypting communications between the virtual machine that generated the host key pair and a client device that is separate from the each of the virtual machines;

providing, by each of the virtual machines, the encryption key generated by the virtual machine to a distinct metadata server that stores parameters of the virtual machine and that is configured to communicate with the virtual machine but not with other virtual machines of the plurality of virtual machines; and sending, from each of the metadata servers, the encryption key generated by the virtual machine that the metadata server is configured to communicate with to an application programming interface system.

16. The system of claim 15 wherein the request is generated by a virtual machine or by a client device.

17. The system of claim 15 wherein the metadata server is configured to communicate with the virtual machine using a secure protocol.

18. The system of claim 15 wherein the host key pair is generated during bootup of the virtual machine.

19. The system of claim 15 wherein the application programming interface system includes data processing apparatuses that are configured to process client requests.

20. The system of claim 19 wherein the client requests include requests for the encryption key associated with the virtual machine, status of the virtual machine, or load of the virtual machine.

21. A non-transitory computer-readable medium having instructions stored thereon, which, when executed by a one or more data processing apparatus, cause the one or more data processing apparatus to perform operations comprising:

receiving, using the one or more data processing apparatuses, a plurality of different requests for an encryption key pair from a plurality of different virtual machines, wherein each virtual machine is a hardware virtualization;

for each request, generating, using the one or more data processing apparatuses, a host key pair, the host key pair comprising an encryption key and a decryption key for encrypting and decrypting communications between a respective virtual machine that sent the request and a client device that is separate from the respective virtual machine;

for each request, sending, using the one or more data processing apparatuses, the host key pair to a metadata server for the respective virtual machine that sent the request, wherein the metadata server is configured to exchange metadata with the respective virtual machine, and wherein each host key pair is sent to the respective virtual machine using a different metadata server for each host key pair; and providing, using the one or more data processing apparatuses, the encryption key of the host key pair to the client device upon a client request from the client device.

22. The computer-readable medium of claim 21 wherein a particular request of the plurality of requests is generated by a virtual machine of the plurality of virtual machines or by the client device.

23. The computer-readable medium of claim 21 wherein the one or more data processing apparatuses are one or more servers that provides an application programming interface and is configured to communicate with the client device using a secure protocol.

24. The computer-readable medium of claim 21 wherein the host key pair is generated during bootup of the respective virtual machine.

25. A non-transitory computer-readable medium having instructions stored thereon, which, when executed by a processor, cause the processor to perform operations comprising:

receiving a plurality of requests for an encryption key pair, each request being received by a different respective virtual machine of a plurality of virtual machines, wherein the virtual machines are hardware virtualizations, and wherein the virtual machines execute on the one or more data processing apparatuses;

generating, by each of the virtual machines, a host key pair for the virtual machine, wherein each of the host key pairs comprises an encryption key and a decryption key for encrypting and decrypting communications between the virtual machine that generated the host key pair and a client device that is separate from the each of the virtual machines;

providing, by each of the virtual machines, the encryption key generated by the virtual machine to a distinct metadata server that stores parameters of the virtual machine and that is configured to communicate with the virtual machine but not with other virtual machines of the plurality of virtual machines; and sending, from each of the metadata servers, the encryption key generated by the virtual machine that the metadata server is configured to communicate with to an application programming interface system.

26. The computer-readable medium of claim 25 wherein the request is generated by a virtual machine or by a client device.

27. The computer-readable medium of claim 25 wherein the metadata server is configured to communicate with the virtual machine using a secure protocol.

28. The computer-readable medium of claim 25 wherein the host key pair is generated during bootup of the virtual machine.

29. The computer-readable medium of claim 25 wherein the application programming interface system includes data processing apparatuses that are configured to process client requests.

30. The computer-readable medium of claim 29 wherein the client requests include requests for the encryption key associated with the virtual machine, status of the virtual machine, or load of the virtual machine.

* * * * *